United States Patent [19]
Andersson et al.

[11] Patent Number: 5,771,114
[45] Date of Patent: Jun. 23, 1998

[54] OPTICAL INTERFACE WITH SAFETY SHUTDOWN

[75] Inventors: Anders G. Andersson, San Jose, Calif.; Michael J. Smith, Eden Prairie, Minn.

[73] Assignee: Rosemount Inc., Eden Prairie, Minn.

[21] Appl. No.: 536,397

[22] Filed: Sep. 29, 1995

[51] Int. Cl.$^6$ .................................................. H04B 10/00
[52] U.S. Cl. ...................... 359/171; 359/110; 250/227.15
[58] Field of Search .................................... 359/171, 173, 359/160, 110, 152; 250/227.15

[56] References Cited

U.S. PATENT DOCUMENTS

| | | |
|---|---|---|
| 3,253,588 | 5/1966 | Vuillemier et al. . |
| 3,964,020 | 6/1976 | Dickerson ................................ 340/146 |
| 3,989,942 | 11/1976 | Waddoups ................................ 250/199 |
| 4,091,734 | 5/1978 | Redmond et al. ................... 102/70.2 R |
| 4,107,518 | 8/1978 | McMahon ................................ 250/199 |
| 4,183,054 | 1/1980 | Patisaul et al. ............................ 358/86 |
| 4,290,146 | 9/1981 | Adolfsson et al. ...................... 455/612 |

(List continued on next page.)

FOREIGN PATENT DOCUMENTS

| | | |
|---|---|---|
| 2273371 | 12/1975 | France . |
| 1256568 | 12/1967 | Germany . |
| 45-13764 | 6/1970 | Japan . |
| 49-138855 | 3/1973 | Japan . |
| 51-24103 | 2/1974 | Japan . |
| 59-105730 | 6/1984 | Japan . |
| 60-1564 | 1/1985 | Japan . |
| 61-4159 | 2/1986 | Japan . |
| 62-33535 | 7/1987 | Japan . |
| 64-10880 | 2/1989 | Japan . |
| 2-48959 | 10/1990 | Japan . |
| 3-5637 | 1/1991 | Japan . |
| 3-198442 | 8/1991 | Japan . |
| 2 189 361 A | 10/1987 | United Kingdom . |
| WO 94/12960 | 6/1994 | WIPO . |
| WO 96/12357 | 4/1996 | WIPO . |

OTHER PUBLICATIONS

Press release, "Transmitters Powered by Fiber Optics? That'NT –New Technology," NT International, Sep. 1994.
Cucci, Gerald R., "Light–Powered Systems, a Fiberoptic Interconnect Technology for Process Control."
Product Data Sheet, "Model 3044C Smart Temperature Transmitters, " Rosemount Measurement, pp. 1–15, Oct. 1993.
Banwell, Thomas C. et al., "Powering the Fiber Loop Optically—a cost Analysis," *Journal of Lightwave Technology*, vol. II, No. 3, pp. 481–494, Mar. 1993.
Todd, John R. et al, "Digital Flight Control Systems: Some New Commercial Twists," The 10th Digital Avionics Systems Conference, McDonnell Douglas Corporation, Los Angeles, CA, Oct. 14–17, 1991.
Beaumont, B. et al., "High Efficiency Conversion of Laser Energy and its Application to Optical Power Transmission," *IEEE–PVSC*, Proc. 22nd, Las Vegas, Oct., 1991.
Landry, M. et al., "Power–by–light Systems and Their Components: An Evaluation," *Applied Optics*, vol. 30, No. 9, Mar. 20, 1991, pp. 1052–1061.

(List continued on next page.)

*Primary Examiner*—Rafael Bacares
*Attorney, Agent, or Firm*—Westman, Champlin & Kelly, P.A.

[57] ABSTRACT

A system for transmitting optical power from a first location to a second location. The system includes a first light source at the first location which generates a first light beam. A power converter detects the first light beam at the second location. A first control circuit coupled to the power converter operates a second light source at the second location to generate a return safety light beam after detection of the first light beam. A photodetector detects the return safety light beam at the first location. A second control circuit is coupled between the photodetector and the first light source. The second control circuit detects the presence of the return safety light beam and operates the first light source to generate the first light beam at a first power level prior to detecting the return safety light beam and at a second power level, higher than the first power level, after detecting the return safety light beam.

26 Claims, 5 Drawing Sheets

U.S. PATENT DOCUMENTS

| | | | |
|---|---|---|---|
| 4,316,141 | 2/1982 | Adolfsson et al. | 324/96 |
| 4,321,707 | 3/1982 | Beasley et al. | 455/606 |
| 4,345,482 | 8/1982 | Adolfsson et al. | 73/862.59 |
| 4,346,478 | 8/1982 | Sichling | 455/612 |
| 4,408,123 | 10/1983 | Sichling et al. | 250/226 |
| 4,417,140 | 11/1983 | Adolfsson et al. | 250/227 |
| 4,434,510 | 2/1984 | Lemelson | 455/603 |
| 4,457,582 | 7/1984 | Lewis et al. | 350/96.2 |
| 4,479,264 | 10/1984 | Lockett et al. | 455/605 |
| 4,487,206 | 12/1984 | Aagard | 128/667 |
| 4,490,606 | 12/1984 | Lockett et al. | 250/227 |
| 4,521,684 | 6/1985 | Gilby et al. | 250/227 |
| 4,525,873 | 7/1985 | Baües | 455/600 |
| 4,525,874 | 7/1985 | Baües | 455/600 |
| 4,596,925 | 6/1986 | Gilby | 250/227 |
| 4,651,571 | 3/1987 | McGlade | 73/773 |
| 4,700,352 | 10/1987 | Shikada et al. | 372/20 |
| 4,704,607 | 11/1987 | Teather et al. | 340/825.07 |
| 4,710,977 | 12/1987 | Lemelson | 455/603 |
| 4,713,540 | 12/1987 | Gilby et al. | 250/231 |
| 4,717,240 | 1/1988 | Gilby | 350/163 |
| 4,733,561 | 3/1988 | Gilby | 73/579 |
| 4,777,661 | 10/1988 | Spillman, Jr. | 455/605 |
| 4,789,213 | 12/1988 | Heywang et al. | 350/96.15 |
| 4,820,916 | 4/1989 | Patriquin | 250/227 |
| 4,857,727 | 8/1989 | Lenz et al. | 250/227 |
| 4,879,763 | 11/1989 | Wood | 455/607 |
| 4,887,312 | 12/1989 | Dannhaeuser | 455/607 |
| 4,899,044 | 2/1990 | Hansen et al. | 250/227 |
| 4,905,309 | 2/1990 | Maisonneuve et al. | 455/603 |
| 4,928,319 | 5/1990 | Pitt et al. | 455/612 |
| 4,948,960 | 8/1990 | Simms et al. | 250/227.11 |
| 4,963,729 | 10/1990 | Spillman et al. | 250/227.21 |
| 4,984,297 | 1/1991 | Manome | 455/619 |
| 4,994,675 | 2/1991 | Levin et al. | 359/110 |
| 4,998,294 | 3/1991 | Bank et al. | 359/171 |
| 5,010,770 | 4/1991 | Berthold | 73/702 |
| 5,083,457 | 1/1992 | Schultz | 73/146.5 |
| 5,099,144 | 3/1992 | Sai | 250/551 |
| 5,099,349 | 3/1992 | Yoshida et al. | 359/161 |
| 5,119,679 | 6/1992 | Frisch | 73/705 |
| 5,162,935 | 11/1992 | Nelson | 359/143 |
| 5,170,274 | 12/1992 | Kuwata et al. | 359/182 |
| 5,185,814 | 2/1993 | Healey | 385/24 |
| 5,195,374 | 3/1993 | Parsons et al. | 73/704 |
| 5,258,868 | 11/1993 | Jensen et al. | 359/168 |
| 5,274,490 | 12/1993 | Tsushima et al. | 359/191 |
| 5,301,553 | 4/1994 | Schultz et al. | 73/705 |
| 5,306,955 | 4/1994 | Fryer | 307/116 |
| 5,315,426 | 5/1994 | Aoki | 359/180 |
| 5,351,149 | 9/1994 | Crimmins | 359/181 |
| 5,361,157 | 11/1994 | Ishikawa et al. | 359/168 |
| 5,428,471 | 6/1995 | Mc Dermott | 359/177 |
| 5,453,866 | 9/1995 | Gross | 359/144 |
| 5,523,808 | 6/1996 | Hawley | 359/110 |
| 5,528,409 | 6/1996 | Cucci et al. | 359/171 |

OTHER PUBLICATIONS

Sun, M. et al., "Fiber Optic Pressure Sensor," *SPIE*, vol. 1589, (1991), pp. 83–89.

Henderson, Breck W., "Varian Develops Technology to Send Power Via Fiber Optics," *Aviation Week & Space Technology*, Aug. 13, 1990, p. 74.

Todd, John R. et al., "Development of Fly–by–Light Systems for Commercial Aircraft," Symposium on Opto–Electronic and Fiber Optic Devices and Applications, San Jose, CA, Sep. 16–21, 1990, pp. 1–7.

"Fiber Optics Sensors and Systems," Jun. 1990, pp. 16–18.

Spitzer, M.B. et al., "Monolithic Series–Connected Gallium Arsenide Converter Development," pp. 1–5.

Kirkham, H. et al., "Optically Powered Data Link for Power System Applications," *IEEE Transactions on Power Delivery*, vol. 4, No. 4, Oct. 1989, pp. 1997–2004.

Todd, John R., "Development of Fly–by–Light Systems," Symposium on Opto–Electronic and Fiber Optic Devices and Applications, Boston, MA, Sep. 5–8, 1989, pp. 1–8.

Moss, Tuckerman, "Moving Power Down a Fiber," *Photonics Spectra*, Jul. 1989, p. 52.

Glomb, W.L. Jr., "Electro–Optic Architecture (EOA) for Sensors and Actuators in Aircraft Propulsion Systems," United Technologies Research Center, East Hartford, CT, Jun. 1989, pp. 1–14.

Seal, D.W., "Multiplexing Electro–Optic Architectures for Advanced Aircraft Integrated Flight Control Systems," McDonnell Douglas Corporation, St. Louis, MO Jun. 1989, pp. ii, B–3, B–4.

Mainard, Curt W., "An Optically Interfaced Propulsion Management System Applied to a Commercial Transport Aircraft," McDonnell Douglas, Dayton, OH, May 22–26, 1989, pp. 1–5.

Miskowicz, Janusz, "Telemetric Links Powered by Optical Energy," *Przeglad Telekomunikacyny*, vol. 61, No. 9, (1988) pp. 269–280.

Todd, John R., "Toward Fly–by–Light Aircraft," presented to Society of Photo–Optical Instrumentation Engineer, Boston, MA, Sep. 6–9, 1988, pp. 1–5.

Groβ, W., "Fiber–Optic Hybrid Sensors with Optical Power Supply," *Siemens Forsch.–u. Entwickl.–Ber.*, Bd. 17, Nr. 1 (1988), pp. 13–17.

Lenz, Jim et al., "Fiber Optic Data Bus for Solid State Sensors," *IEEE*, 1988, pp. 80–83.

Todd, John R., "The Role of Fiber Optics on Commerical Aircraft," Symposium on Fiber Optics and Optoelectronics, San Diego, CA, Aug. 16–21, 1987.

Patriquin, D.R., "Optically Interfaced Sensor System for Aerospace Applications," *ISA Transactions*, vol. 26, No. 1, Research Triangle Park, NC (1987), pp. 1,3,5.

Schweizer, Pascal, "Optically Powered Sensors and Network of Associated Sensors," Multilingual Communications Services, Inc., Nice, (1987), pp. 1–10.

Bjork, P. et al., "Optically Powered Sensors," Optical Fiber Sensors Conference, New Orleans, LA, pp. 336–339.

Frankel, D. et al., "Optical Fiber Power Delivery System," *SPIE*, vol. 721 (1986), pp. 104–110.

Peters, A., "The DMX–6000 Distributed Measurement System," *Mechanical Engineering*, May 1985, pp. 40–42.

Hall, P., "Optically–Powered Sensor Network," GEC Research Limited, Chelmsford, 2/1–2/3.

Ohte, A. et al., "Optically–Powered Transducer with Optical–Fiber Data Link," *SPIE*, vol, 478 (1984), pp. 33–38.

Akiyama, K. et al., "Optically–Powered Transducer with Optical–Fiber Data Link," vol. 23, No. 6, (Jun. 30, 1987), pp. 570–575.

Akiyama, K. et al., "Optically–Powered Temperature Sensor Transducer with Optical–Fiber Data Link," Proc. 22nd SICE Annual Conference, (Jul. 27–29, 1983), pp. 207–208.

Akiyama, K. et al., "Optically Powered Temperature Sensor with Optical–Fiber Data Link," Proc. 21st SICE Annual Conference, (Jul. 28–30, 1982), pp. 221–222.

Miller, R.C. et al., "Wideband, Bidirectional Lightguide Communication with an Optically Powered Audio Channel," *The Bell System Technical Journal*, vol. 61, No. 7, part 1, (Sep. 1982), pp. 1359–1365.

"Smoke Alarm Uses Fiber Optics for Hazardous Areas," *Electronic Design*, (Sep. 3, 1981), p. 64.

McGowan, M., "Multiple Pressure Transmitters Speak Digital on Two Wires," *Control Engineering*, (Dec. 1979).

Miller, R.C. et al., "Optically Powered Speech Communication Over a Fiber Lightguide," *The Bell System Technical Journal*, vol. 58, No. 7, (Sep. 1979), pp. 1735–1741.

DeLoach, B.C. et al., "Sound Alerter Powered Over an Optical Fiber," *The Bell System Technical Journal*, vol. 57, No. 11, (Nov. 1978), pp. 3309–3317.

Untgreberger, H. et al., "Application of Optical Transmission in Today's and Future Communication Networks," Paris, (Sep. 27–30, 1976).

Crump, L., "Powering Transistorized Electronic Devices with Radiated Energy (U)," Department of the Army, Washington, DC, (Feb. 15, 1956), pp. 1–17 (odd only).

Hollmann, H.E., "Designing 'Free–Power' Transistorized," *Electronic Industries & Tele–Tech*, (Sep. 1956), pp. 54–56, 92–95.

Oi, K., "Telemetering," Nikkan Kogyo Shimbun–Sha, pp. 212–218.

Lui, K., "Pressure Sensors and Actuators Incorporating Optical Fibre Links," *Sensors and Actuators*, vol. 17, (1989), pp. 501–507.

Thomas C. Banwell et al., "Powering the Fiber Loop Optically –A Cost Analysis", *Journal of Lightwave Technology*, vol. II, No.3, Mar. 11, 1993, pp. 481–494.

Communication requesting quote from Photonic Power Systems for a Thomson–CSF High Power Module having an optical safety feature, Dec. 14, 1993.

OPTICAL INTERFACE WITH SAFETY SHUTDOWN

BACKGROUND OF THE INVENTION

The present invention relates to an optical interface for safely transmitting optical power to a remote electrical device and, in particular, to an optical interface with a safety shutdown feature.

Optical interfaces which provide power and information to remote electrical devices have a wide range of applicability. The applications include, among others, industrial process control systems, aircraft flight control systems, communication systems, medical instruments, ordnance and electric power monitoring. Providing power and information through an optical fiber or through the atmosphere eliminates the need for electrical wires or a local power supply to operate remote devices.

Optical interfaces are immune to electromagnetic interference (EMI), radio frequency interference (RFI), noise, lightening, transients and cross-talk which are often problems for control and communication systems which use electrical wires. Optical interfaces also provide electrical isolation and do not create spark or shock hazards which can be dangerous in reactive environments.

However, high powered lasers are typically required to transmit enough power to energize the remote devices. The use of high powered lasers or other light sources can create hazards if the fiber which carries the light is accidentally cut or not installed properly. For example, light emitting from a broken or loose fiber may cause injury to persons nearby or may cause an explosion in a reactive environment by heating dust particles. Likewise, in systems in which no fiber is used to carry the light, similar hazards can occur if the laser becomes misaligned or blocked by a person or object.

The terms "light," "optic" and "radiation" as used herein refer to visible and invisible electromagnetic radiation with wavelengths shorter than about 100 microns (100,000 nm). The terms "electric" and "electrical" refer to lower frequency phenomenon such as commonly occur in electronic circuits operating at frequencies below 100 MHz. The term "beam" refers to light having a power component, a data signal component or both.

SUMMARY OF THE INVENTION

The present invention is directed to a system for safely transmitting optical power from a first location to a second location at a low power level until the optical connection is verified between the first and second locations. The system includes a first light source at the first location which generates a first light beam. A first optical detector detects the first light beam at the second location. A first control circuit is coupled to the first optical detector for operating a second light source at the second location to generate a return safety light beam after detection of the first light beam. A second optical detector detects the return safety light beam at the first location. A second control circuit is coupled between the second optical detector and the first light source for determining a presence of the return safety light beam. The second control circuit operates the first light source at a first power level prior to determining the presence of the return safety light beam. The second control circuit operates the first light source at a second power level, higher than the first power level, after determining the presence of the return safety light beam.

In one embodiment, the first optical detector comprises a photovoltaic power converter which converts the first light beam into electrical power that is applied to an energy storage device, such as a capacitor. The first control circuit comprises a first voltage level detector coupled to the energy storage device which discharges the capacitor through the second light source to generate the returning safety light beam when the level of stored energy in the capacitor is indicative of the first light source being operated at the first power level.

The first control circuit may further include a second voltage level detector connected to the energy storage device, which has a higher voltage threshold and a faster response time characteristic than the first voltage level detector. When the first light source is operated at the second power level, the capacitor charges quickly and triggers the second voltage level detector. The second voltage level detector inhibits the first voltage level detector and couples the energy storage device to the electrical device for energizing the device. This allows the optical connection to be verified and the capacitor to develop a sufficient level of charge before being loaded by the electrical device.

Once the first level detector has been disabled and the first light source is being operated at the second power level, a microprocessor and logic circuit at the second location take over the function of generating the return safety light beam. If the beam is not detected at the first location, the second control circuit returns the first light source to the first power level until the optical connection can be reestablished and a subsequent safety beam is detected.

Depending on the optical components used, the wavelengths of the light and the number of fibers used, it may be preferable to operate the first light source in a mode in which the first light source pulses between on and off states. This allows the return safety light beam to be transmitted and detected during the off states without interference from the first light source. A zero level detector is electrically coupled to the power converter at the second location to detect the off state of the light source and trigger the return of the safety light beam.

In one embodiment of the present invention, the system transmits digital messages from the second location to the first location by modulating the output of the second light source. Once the data is ready to be transmitted, the microprocessor at the second location inhibits the return safety beam which instructs the second control circuit to wait briefly for a digital message. If a digital message is detected at the first location, the second control circuit extends the off state of the first light beam a sufficient length of time to receive the digital message. If no message is received at the first location, the second control circuit returns the first light source to the first power level.

The light beam can be transmitted through the atmosphere, a single optical fiber or a plurality of optical fibers.

DETAILED DESCRIPTION OF THE PREFERRED EMBODIMENTS

The present invention is an optical interface for safely transmitting power from a first location to a second location. The interface also has convenient packaging which can be installed easily in a plurality of differently sized devices. Although the present invention is discussed below with reference to industrial process control systems, the present invention is also applicable to medical instruments, communication systems, aircraft control systems, ordnance, electric power monitoring and any application in which high powered light is transmitted from one location to another.

Figure 1:
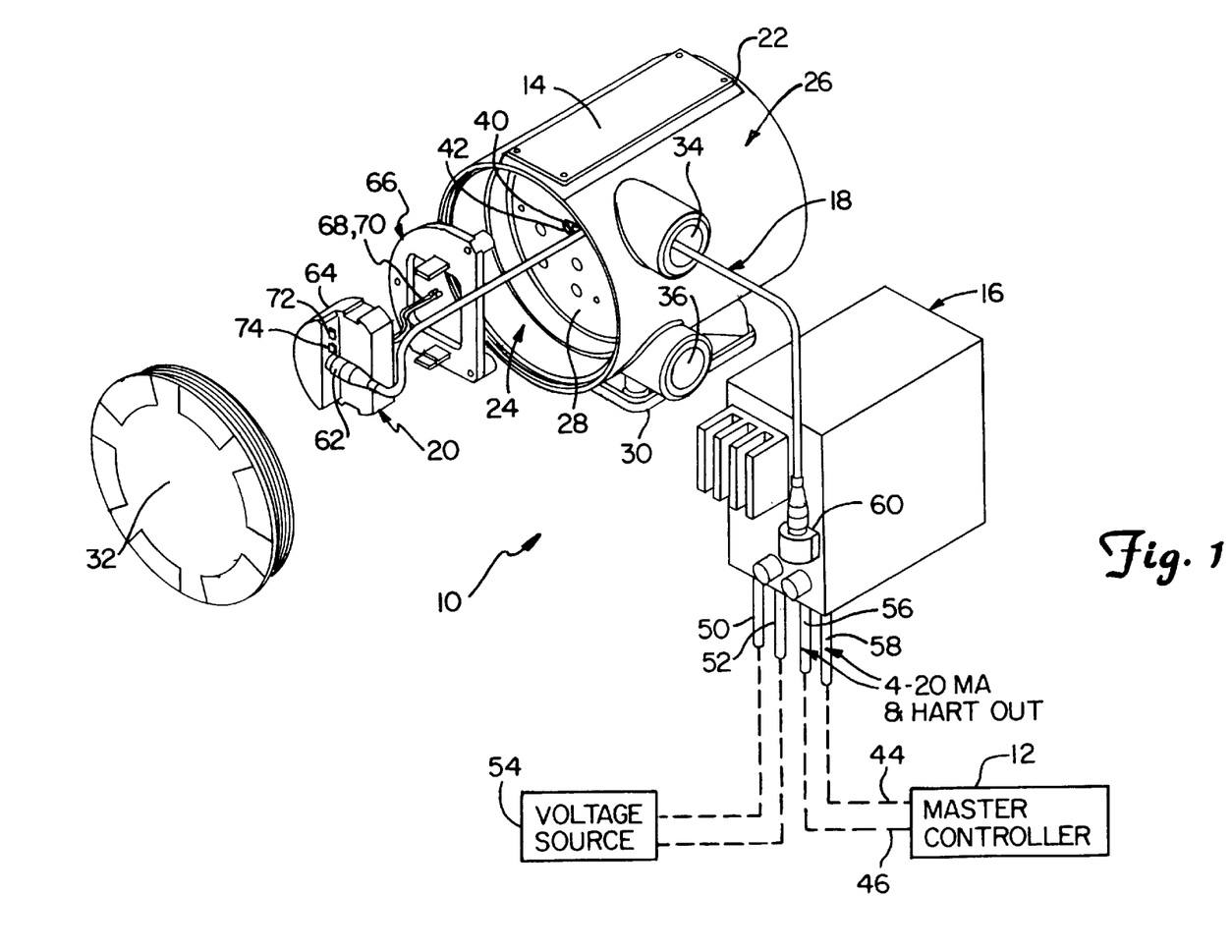
FIG. 1 is a perspective view of an optical interface according to the present invention.

FIG. 1 is a perspective view of an optical interface coupled in a typical industrial process control system. Optical interface 10 is coupled between master controller 12 and field instrument 14. Interface 10 includes power module 16, fiber 18 and interface module 20.

Master controller 12 can include a variety of devices, such as a central control station, a remote communication device or another control or test device. Field instrument 14 can also include a variety of devices, such as a process variable transmitter, an actuator, a transducer, a switch, a stand alone controller, a valve, a current-to-pressure (I/P) converter or a switch. Field instruments are used to control processes, measure process variables and generate outputs representative of the process variables for communication to central controllers or field control elements (e.g. valves or actuators) over process control loops. Process control loops have typically included two-wire, three-wire and four-wire process control loops. Other loops have also been used, such as optical and radio frequency control loops.

Field instrument 14 includes explosion-proof housing 22, terminal compartment 24, electronics compartment 26, bulkhead 28, base 30, cover 32 and access ports 34 and 36. Bulkhead 28 divides the interior of housing 22 into terminal compartment 24 and electronics compartment 26. Cover 32 threads onto housing 22 to seal terminal compartment 24. Access ports 34 and 36 provide access to terminal compartment 24 from outside housing 22. Bulkhead 28 includes electrical terminals 40 and 42 which extend through the bulkhead and are electrically coupled to the instrument within the electronics compartment through radio frequency interference (RFI) filters.

In a traditional system, terminals 40 and 42 would be electrically coupled to a two-wire process control loop through a terminal block (not shown) mounted in the terminal compartment. The two-wire process control loop (a twisted pair of wires) would extend through access port 34 and be coupled to terminals 44 and 46 of master controller 12. A two-wire process control loop transmits and receives signals in the form of 4–20 mA analog signals with superimposed digital data according to a selected protocol, such as the HART® protocol. The HART® protocol uses a standard frequency shift keying (FSK) technique to modulate the data on the 4–20 mA analog signal. Other protocols can also be used, such as the Fieldbus Communication Standard which is presently being developed by the Fieldbus Foundation, Control Area Network (CAN), MODBUS or a base band modulation such as the DE protocol.

Optical interface 10 replaces the traditional two-wire process control loop to allow for optically powering and bi-directionally communicating with remote electrical devices over a single or dual fiber or through the atmosphere. Power module 16 is enclosed in a well-known DIN style box which is located near master controller 12. Power module 16 includes power supply terminals 50 and 52 which are connected to a nominal 24 volt DC power supply 54. Terminals 56 and 58 are signal terminals which are connected to terminals 44 and 46 of master controller 12. Terminals 44 and 46 carry 4–20 mA analog signals with superimposed digital data. Power module 16 further includes a fiber optic connector 60 which is optically coupled to fiber 18. Fiber 18 can have a single strand or multiple strands threaded through access port 34 and optically coupled to one or more fiber optic connectors 62 on interface module 20.

Interface module 20 is housed in a plastic shroud 64 which is attached to a mounting plate 66. Mounting plate 66 is secured to bulkhead 28 within terminal compartment 24. Shroud 64 can also be secured directly to bulkhead 28. Electrical leads 68 and 70 extend from the electronics within interface module 20 for connection to terminals 40 and 42, respectively, on bulkhead 28. Electrical leads 68 and 70 are also attached to terminals 72 and 74 on shroud 64 for access by a remote transmitter interface (RTI) or other test device. Electrical power and data provided by master controller 12 are converted to an optical beam comprising power and data by power module 16 and transmitted over fiber 18 to interface module 20. Interface module 20 converts the optical beam back into electrical power and data which are provided to field instrument 14 through leads 68 and 70. It has been found that, in one embodiment, up to 5,000 feet of 200 micrometer fiber optic cable can be used to connect power module 16 to interface module 20.

In one embodiment, field instrument 14 is provided with instructions over fiber 18 or through terminals 72 and 74 to configure the instrument in a HART® "multi-drop" mode in which the analog signals are effectively disabled and set to a low-power 4 mA level. The multi-drop mode consumes less power and provides for full bi-directional digital communication according to the selected protocol.

Figure 2:
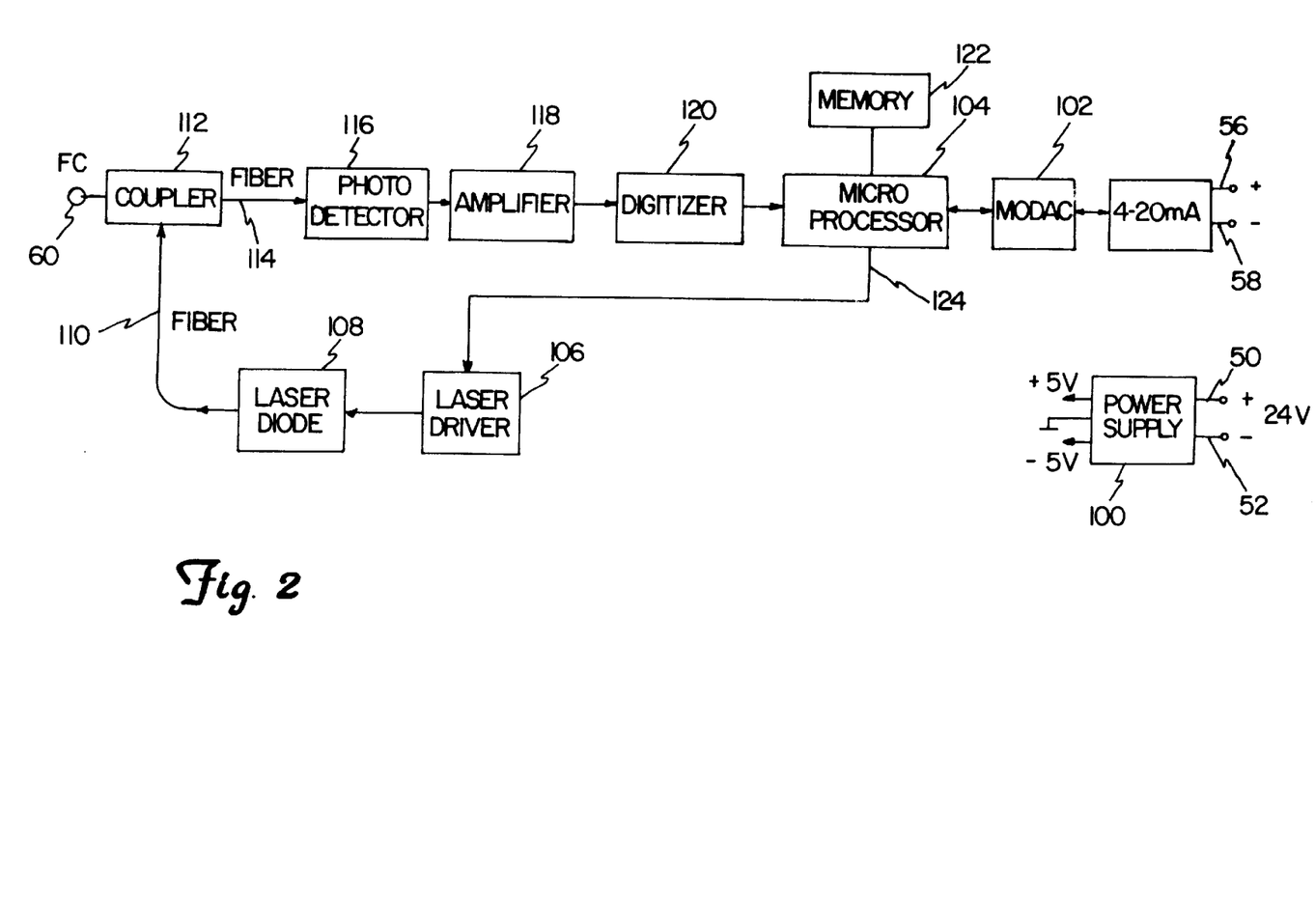
FIG. 2 is a block diagram of a power module of the interface shown in FIG. 1.

FIG. 2 is a block diagram of power module As shown on the right-hand side of the diagram, power supply terminals 50 and 52 are connected to internal power supply 100 which generates a positive and a negative 5-volt supply voltage for operating the various electrical and opto-electronic components in power module 16.

power module 16 further includes MODAC 102, microprocessor 104, laser driver circuit 106, laser diode 108, fiber 110, fiber optic connector 60, coupler 112, fiber 114, photodetector 116, amplifier 118, digitizer 120 and memory 122. Signal terminals 56 and 58 are coupled to MODAC 102. MODAC 102 is an ASIC developed by Rosemount Inc. which includes a HART® compatible modem (a modulator and demodulator) and a digital-to-analog (D/A) converter. MODAC 102 can be replaced with any suitable modem and digital-to-analog converter together with the appropriate control logic. The modem within MODAC 102 demodulates digital messages received on terminals 56 and 58 and provides the digital messages to microprocessor 104. MODAC 102 also receives digital messages and process variable measurements from microprocessor 104, converts the process variable measurements to 4–20 mA analog signals and modulates the digital messages onto the analog signals, thereby establishing two-way communication with master controller 12 (shown in FIG. 1). The term "process variable" used herein refers to a variable such as pressure, temperature, flow, level, specific gravity, etc., sensed by a transmitter or other sensor such as a process control or aerospace instrument.

Memory 122 is connected to microprocessor 104 and stores programmed instructions for operating microprocessor 104. Microprocessor 104 can include any programmed computer or microcontroller, or can be replaced with a digital or analog logic circuit. Control output 124 of microprocessor 104 is connected to laser driver circuit 106. Control output 124 provides data and control signals to laser driver circuit 106.

During normal operation, microprocessor 104 repetitively requests the value of a process variable being measured by field instrument 14 (shown in FIG. 1). Microprocessor 104 sends a digital request message as a serial data string to laser driver circuit 106 which modulates an upper portion, such as the upper 5%, of the output power of laser diode 108, which is transmitted over fiber 110, through coupler 112, out connector 160 and through fiber 18 to interface module 20. Binary one and zero are represented by "on" and "off" states in the upper 5% portion of the output power. The lower 95% of the output power of laser diode 108 continues to provide power to interface module 20 and field instrument 14. The output of laser diode 108 has a wavelength of approximately 810 nanometers. Although a laser diode is shown in FIG. 2, any light source can be used with the present invention, such as a gas laser, a light emitting diode (LED) or an incandescent lamp. A laser diode may be preferred in some embodiments due to its high power output, small size and efficient coupling to a fiber.

An incoming light beam carrying a digital message, such as a response to the request for a process variable measurement, is received at connector 60, passed through coupler 112 and fiber 114, and detected by photodetector 116. Binary one and zero are represented in the incoming light beam by on and off states of the light. Coupler 112 can include any commercially available optical coupler, such as a fusion spliced 2:1 fiber optic coupler or a wavelength division multiplexer (WDM). In one embodiment, the photodetector includes a photodiode such as a PIN diode. Photodetector 116 could also include any other suitable optical-to-electrical converter. The light beam received by photodetector 116 is converted into a weak electrical signal comprising a serial string of binary ones and zeros which are amplified by amplifier 118 and applied to a digitizer 120. Digitizer 120 conditions the signals provided by amplifier 118 into a form that can be recognized by microprocessor 104. Microprocessor 104 receives the signals in an internal shift register to recover the digital message. Microprocessor 104 can store the message in memory 122, provide the message to MODAC 102 for transmission to master controller 12 or perform other analysis or control functions based on the message.

Prior to driving laser diode 108 at high power levels, microprocessor 104 verifies the optical connection between power module 16 and interface module 20. Microprocessor 104 provides control signals to laser driver circuit 106 to operate laser diode 108 in a low power, "LED" mode, to send a light beam at a low power level (approximately 2 mW) to interface module 20. In the low power mode, laser diode 108 operates at a 50% duty cycle so that laser diode 108 pulses between "on" and "off" states. Upon receiving the low power light beam, interface module 20 generates a return "safety" pulse over fiber 18 indicating that the low power light beam was received.

During the "off" state of laser diode 108, the return safety pulse from interface module 20 is converted by photodetector 116 into an electrical signal which is detected by microprocessor 104. The return of the safety pulse from interface module 20 verifies that optical fiber 18 is properly connected and that it is safe for microprocessor 104 to turn laser diode 108 on at high power.

Figure 3:
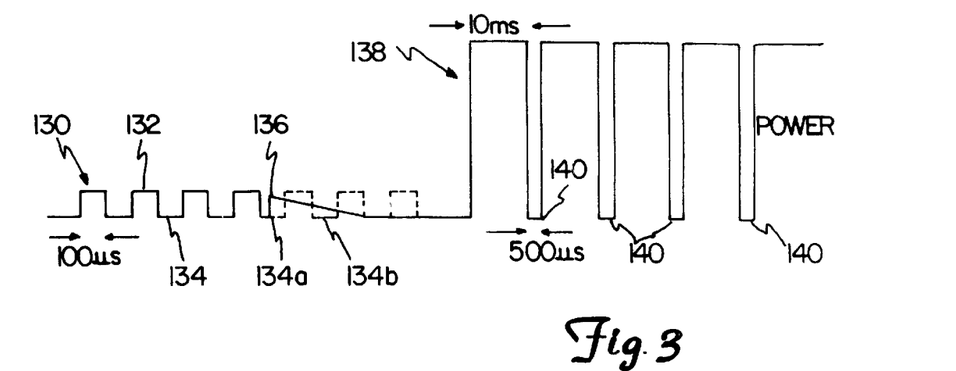
FIG. 3 is a waveform diagram illustrating the output of a laser operated at a low power level and a high power level according to the present invention.

The operation of the optical connection safety feature is illustrated in greater detail in FIG. 3. Waveform 130 illustrates the output of laser diode 108 in low power mode. The output of laser diode 108 pulses between on and off states 132 and 134 at a 50% duty cycle. The light output at off state 134 may be zero or a very low output level. A return safety pulse 136 is superimposed on waveform 130. The return safety pulse 136 is long enough so that microprocessor 104 can determine the presence or absence of the pulse during off states 134a or 134b. If pulse 136 is present, microprocessor 104 provides control signals to laser driver circuit 106 to operate laser diode 108 at a high power level (approximately 500 mW) with a 95% duty cycle, as illustrated by waveform 138.

The fiber optic connection safety feature continues to function while laser diode 108 is in the high power mode. Interface module 20 transmits a return safety pulse to power module 16 during each off cycle 140 of laser diode 108. If the pulse is not detected by microprocessor 104 during each off cycle 140, microprocessor 104 will send control signals to laser driver circuit 106 to return laser diode 108 to the "safe," low power mode. Therefore, any break or disconnection in optical fiber 18 will prevent the return safety pulse from reaching power module 16 and laser diode 108 will be returned to a safe output level within a fraction of a second.

The incoming digital messages from interface module 20 are incorporated into the safety feature. When a digital message is ready to be sent to power module 16, interface module 20 stops the normal return safety pulse. When microprocessor 104 detects the absence of the return safety pulse during an off state of laser diode 108, microprocessor 104 waits briefly for a digital message to be sent from interface module 20 to power module 16. If microprocessor 104 detects an incoming message, microprocessor 104 returns laser diode 108 to full power after a fixed period of time which allows receipt of the digital message during the "off" state of the laser diode. The length of time that the laser diode is off to receive a message is longer than the normal off time for receiving the return safety pulse. Once the digital message has been received, microprocessor 104 provides the digital message to MODAC 102 which converts the digital message into a 4–20 mA analog signal and a HARTS® FSK output which are applied to terminals 56 and 58. If microprocessor 104 does not detect an incoming digital message, microprocessor 104 instructs laser diode driver circuit 106 to operate laser diode 108 in the low power or off mode until a return safety pulse is received.

Figure 4:
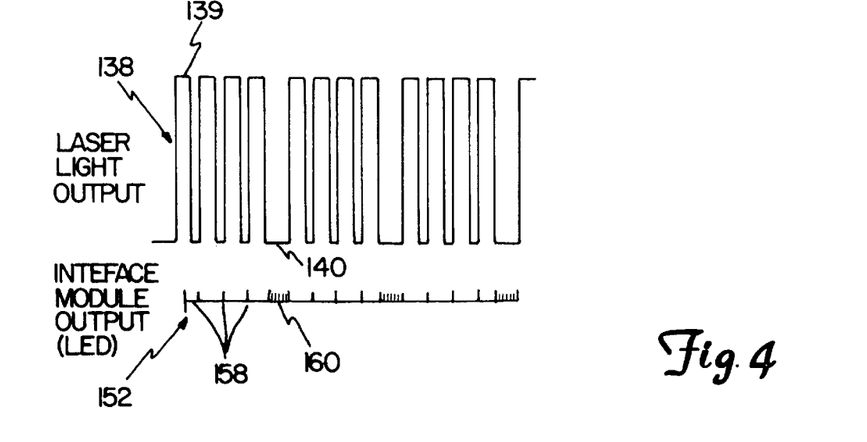
FIG. 4 is a waveform diagram illustrating timing of return safety pulses and digital messages with respect to off states of the laser.

FIG. 4 illustrates the timing of return safety pulses and digital messages in greater detail. Waveform 138 represents the light output of laser diode 108. Waveform 152 represents the light output of an LED in interface module 20. Laser 108 pulses between on and off states 139 and 140, respectively. During each off state 140, the LED in interface module 20 returns a safety pulse 158. When interface module 20 has a digital message 160 to be transmitted to power module 16, it inhibits the normal safety pulse which instructs power module 16 to extend the off state of laser diode 108 and "listen" for the digital message. Interface module 20 then sends the message in a burst while laser diode 108 is off.

Figure 5:
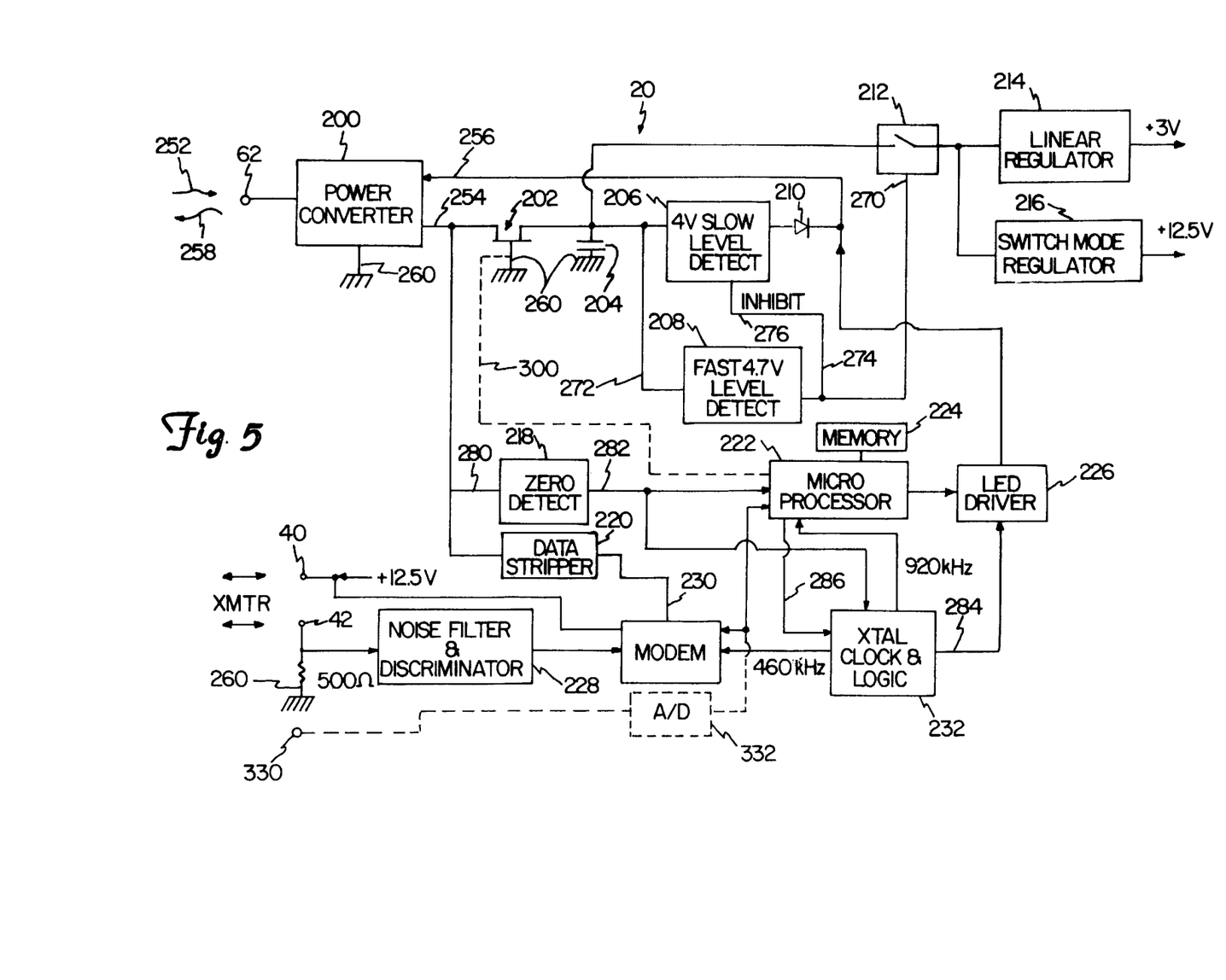
FIG. 5 is a block diagram of an interface module of the interface shown in FIG. 1.

FIG. 5 is a block diagram of interface module 20. Interface module 20 includes power converter 200, transistor 202, energy storage device 204, 4-volt slow level detect circuit 206, fast 4.7-volt level detect circuit 208, diode 210, switch 212, linear voltage regulator 214, switch mode voltage regulator 216, zero detect circuit 218, data stripper 220, microprocessor 222, memory 224, LED driver circuit 226, noise filter and discriminator circuit 228, modem 230 and crystal clock and logic circuit 232.

Connector 62 is optically coupled to power converter 200. Power converter 200 converts light beam 252 received from power module 16 into electrical power which is applied to terminal 254. Likewise, power converter 200 receives electrical signals at terminal 256 and converts the electrical signals into a return light beam 258 for transmission to power module 16.

In one embodiment, power converter 200 includes a photovoltaic power converter having six discrete pie-shaped segments, with five segments being connected in series between terminal 254 and ground terminal 260 to convert light beam 252 into electrical power. The remaining segment is dedicated as a light emitting diode (LED) which is electrically coupled between terminal 256 and ground terminal 260 for generating the return light beam 258 at a wavelength of 880 nm, for example. Other configurations can also be used with the present invention. For example, Jensen et al. U.S. Pat. No. 5,258,868, which is hereby incorporated by reference, discloses several useful configurations. In one configuration, a separate LED is positioned in front, back or to the side of a gallium arsenide photodetector. If the LED is positioned in back of the photodetector, the photodetector can include a hole for passing light from the LED or can be formed of a material which is substantially transparent to the wavelength of the light from the LED. Examples of commercially available power converters include PPC-6S-STID and PPC-12 S-STID by photonic power Systems, Inc., Mountain View, Calif.

Transistor 202 is a CMOS transistor, for example, which has a source connected to terminal 254, a drain connected to energy storage device 204 and a gate connected to ground terminal 260. Transistor 202 prevents the charge on device 204 from discharging back through power converter 200. Transistor 202 can be replaced with a diode. The electrical power generated on terminal 254 passes through transistor 202 and charges energy storage device 204. Energy storage device 204 preferably includes a capacitor, but could also include other energy storage devices such as a chargeable battery. Switch 212 is connected between capacitor 204 and regulators 214 and 216. Switch 212 has a control input 270 which operates switch 212 between open and closed states. Switch 212 is normally in the open state such that capacitor 204 and power converter 200 are not loaded by regulators 214 and 216 until laser diode 108 is in the high power mode.

When microprocessor 104 (shown in FIG. 2) operates laser diode 108 in the low power mode (approximately 2 mW), the electrical power generated on terminal 254 by power converter 200 slowly charges capacitor 204. When the voltage across capacitor 204 reaches 4 volts, 4-volt slow level detector circuit 206 discharges capacitor 204 through diode 210 and into the LED in power converter 200, which generates a return safety light pulse that is transmitted to power module 16 through fiber 18. As mentioned above, the return safety light pulse is detected by microprocessor 104 during the off state of the laser diode waveform. Once the optical connection has been verified, microprocessor 104 turns laser diode 108 on to full power.

Fast 4.7-volt level detector circuit 208 has an input 272 electrically coupled to capacitor 204 and a control output 274 which is electrically coupled to an inhibit input 276 of detector 206 and control input 270 of switch 212. Detector 208 has a higher voltage threshold than detector 206 and has a faster response time characteristic. The voltage threshold of detector 208 is selected such that the electrical power generated by power converter 200 during the low power mode of laser diode 108 is insufficient to charge capacitor 204 to a level that would trigger the control output 274 of detector 208. The response time characteristic of detector 206 is reduced (by about a factor of ten) by providing a lowpass filter (not shown) at the input of detector 206.

When microprocessor 104 operates laser diode 108 in the high power mode, the electrical power generated by power converter 200 quickly charges capacitor 204, thereby triggering control output 274 of detector 208 which disables detector 206 and closes switch 212 to power regulators 214 and 216. Switch 212 therefore couples regulators 214 and 216 to capacitor 204 only after a sufficient level of charge has developed on capacitor 204 to operate the various electrical components in interface module 20 and in field instrument 14 (FIG. 1). Regulator 214 generates a regulated 3 volt supply voltage for operating the electrical components of interface module 20. Regulator 216 generates a 12.5-volt supply voltage which is applied to terminals 40 and 42 for operating the electronics in field instrument 14.

Once detector 206 is disabled and laser diode 108 is operating in the high power mode, zero detect circuit 218, microprocessor 222, LED driver 226 and crystal clock and logic circuit 232 take over the function of generating return safety light beams during the off state of laser diode 108. Memory 224 is coupled to microprocessor 222 and stores programmed instructions for operating microprocessor 222.

Zero detect circuit 218 has an input 280 electrically connected to terminal 254 of power converter 200 and an output 282 connected to microprocessor 222 and crystal clock and logic circuit 232. When laser diode 108 is in the off state, zero level detect circuit 218 detects a zero or low level in the electrical power applied by power converter 200 to terminal 254 and generates a zero level output signal on output 282.

Crystal clock and logic circuit 232 generates a return safety electrical pulse on output 284 upon receipt of the zero level output signal, which is applied to LED driver 226. In response, LED driver 226 operates the LED within power converter 200 to generate a return safety light pulse during the off state of laser diode 108. In addition to supplying return safety pulses, crystal clock and logic circuit 232 generates a 920 kHz clock signal for operating microprocessor 222 and a 460 kHz clock signal for operating modem 230.

As mentioned above, return digital messages are incorporated in to the optical connection safety feature. Microprocessor 230 receives digital messages from field instrument 14 through terminals 40 and 42, which pass through a noise filter and discriminator circuit 228 and modem 230. Modem 230 is a HART® compatible modem which provides the digital message to microprocessor 222 as a serial stream of data. Microprocessor 222 includes a shift register (not shown) which collects the data until a complete digital message is ready for transmission to power module 16. Once microprocessor 222 has determined that there is a complete digital message to be transmitted to power module 16, microprocessor 222 generates a control signal 286 which inhibits crystal clock and logic circuit 232 from generating a return safety pulse and begins sending the digital message as a compressed burst of serial data to LED driver 226 after receiving the next zero level output signal from zero detect circuit 218. LED driver 226 modulates the output of the LED in power converter 200 with the digital message. Diode 210 protects detector 206 from drive signals provided by LED driver 226.

Likewise, interface module 20 is capable of receiving optically encoded digital messages from power module 16. When light beam 252 generated by laser diode 108 includes an encoded digital message, data stripper 220, which may include a demodulator, strips the digital message (i.e. signal component) off the resulting electrical power applied to terminal 254 and provides the message as a serial string of binary ones and zeros to modem 230. Modem 230 transmits the digital message to field instrument 14 through terminals 40 and 42. Power module 16 and interface module 20 therefore provide bidirectional digital communication over fiber 18.

Interface module 20 can include various alternative embodiments. For example, the gate of transistor 202 can be connected to microprocessor 222 (as shown in dashed line 300), as opposed to ground terminal 260. In this embodiment, microprocessor 222 can control the current flow through transistor 202 to selectively provide more current to charge capacitor 204 or provide greater protection for power converter 200 of the charge in capacitor 204.

Detectors 206 and 208 can include any suitable device for detecting the level of energy stored in capacitor 204. For example, the detectors can include voltage detectors, current detectors, comparators or relays.

The electrical connections between interface module 20 and field instrument 14 can be modified to provide direct measurements of a process variable over a separate terminal 330. The voltage on terminal 330 represents a direct measurement of the process variable and therefore has a much higher update rate (approximately 20 times per second) than the digital messages received by modem 230 (approximately two times per second). Terminal 330 is attached to A/D converter 332 (shown in phantom) which is connected in parallel with modem 230 and provides digital process variable measurements to microprocessor 222. Microprocessor 222 sends a combination of the "fast" digital process variable measurements from A/D converter 332 and the compressed digital messages received by modem 230 to power module 16 through LED driver 226 and the LED in power converter 200.

For embodiments in which the electronic device operated by interface module 20 requires an analog signal to actuate a physical device, modem 230 includes a digital-to-analog converter which varies the analog signals on terminals 40 and 42 according to digital messages provided by power module 16. Examples of industrial process control devices requiring analog signals which can be used with the present invention include Model 3311 Current-to-Pressure (I/P) Converter and the Fieldview product developed by Fisher-Rosemount. An I/P converter controls the pressure supplied to a pneumatic actuated valve in accordance with the level of current flowing through terminals 40 and 42.

Figure 6:
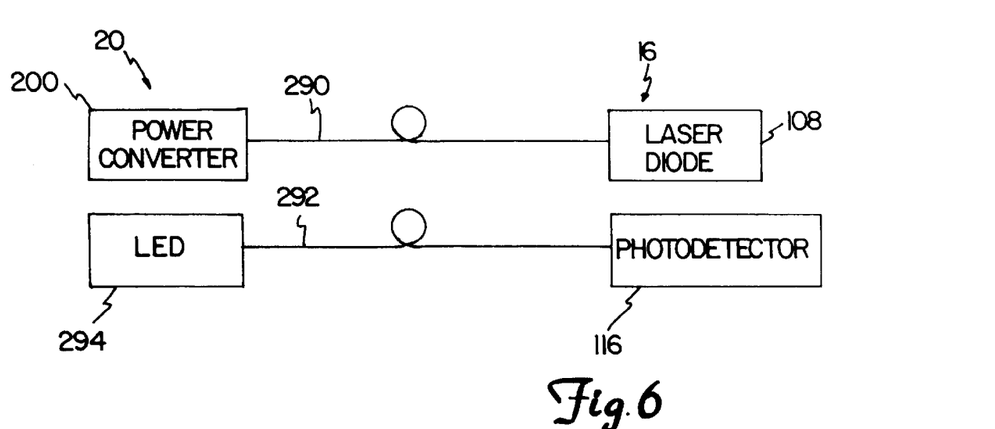
FIG. 6 is a block diagram of an optical interface with two fibers according to an alternative embodiment of the present invention.

FIG. 6 is a diagram of an alternative embodiment in which power module 16 is coupled to interface module 20 through first and second optical fibers 290 and 292. The same reference numerals are used in FIG. 6 for similar elements as were used in the previous figures. Laser diode 108 is coupled to power converter 200 over fiber 290. An LED 294, which is separate from power converter 200, is optically coupled to photodetector 116 through fiber 292. The optical connection safety feature of the present invention operates in the same manner in the embodiment shown in FIG. 6 as was discussed with reference to FIGS. 1–5. However, since two fibers are used, laser diode 108 does not "drown out" the low level light beam generated LED 294. Microprocessor 104 (shown in FIG. 2) can therefore operate laser diode 108 at a constant level without pulsing the laser diode between on and off states. This provides more power to interface module 20. In addition, LED 294 can provide a constant or intermittent return safety light beam to photodetector 116 which does not have to be timed during an off state of laser diode 108. Therefore, zero detect circuit 218 (shown in FIG. 5) would not be required.

In yet another alternative embodiment, the optical components used in power module 16 and interface module 20 are wavelength sensitive such that the light beam generated by power module 16 and interface module 20 would not interfere with one another as described in Jensen et al. U.S. Pat. No. 5,258,808. In this embodiment, one fiber can be used to provide bi-directional optical communication without requiring safety and data signals to be timed with off states of laser diode 108. Coupler 112 could include a wavelength division multiplexer (WDM) to differentiate between the wavelengths.

The optical connection safety feature of the present invention can also be used in embodiments in which power module 16 provides power, but not information, to interface module 20. The return data from interface module 20 is also optional.

Figure 7:
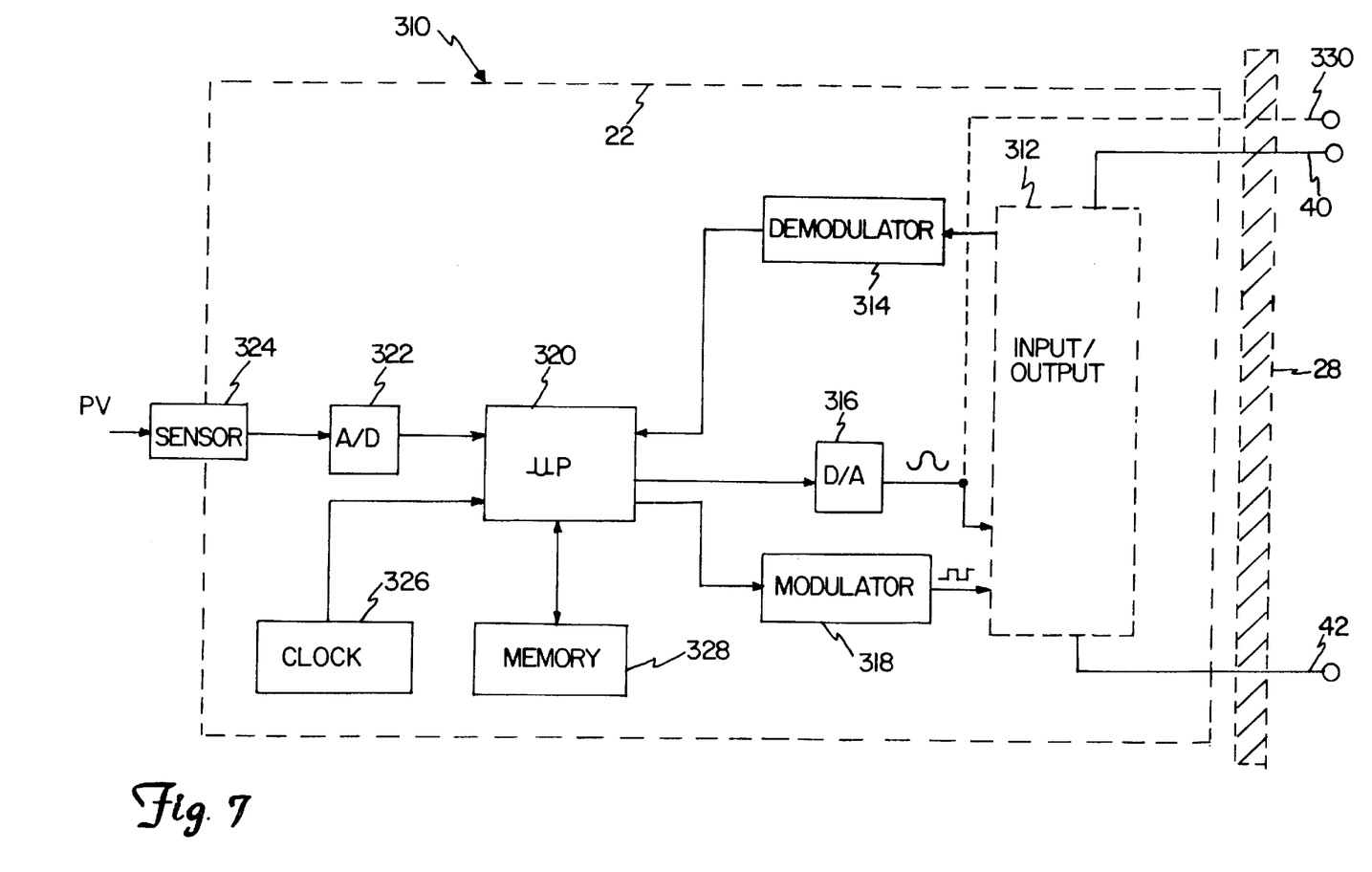
FIG. 7 is a block diagram of a transmitter which may be coupled to the interface module shown in FIG. 5.

FIG. 7 is a block diagram of an embodiment in which field instrument 14 includes a process variable measurement transmitter. Transmitter 310 includes housing 22, terminals 40 and 42 which extend through bulkhead 28, input-output circuit 312, demodulator 314, digital-to-analog (D/A) converter 316, modulator 318, microprocessor 320, analog-to-digital (A/D) converter 322, sensor 324, clock 326 and memory 328. Demodulator 314, D/A converter 316, modulator 318 and input-output circuit 320 are incorporated in a MODAC ASIC developed by Rosemount Inc. Incoming messages are demodulated by demodulator 314 and provided to microprocessor 320. Sensor 324 measures a process variable (PV) and generates a voltage, for example, which represents the measured process variable. A/D converter 322 converts the voltage to a digital value which is supplied to microprocessor 320. Microprocessor 320 provides the process variable measurement to modulator 318 which modulates an analog signal generated by input-output circuit 312 on terminals 40 and 42.

Process variable measurements can also be supplied from transmitter 310 to interface module 20 directly through a separate terminal 330 (as shown in phantom). Terminal 312 is connected to the output of D/A converter 316, which supplies an analog voltage representative of the process variable to input/output circuit 312 for conversion into a 4–mA signal.

Although the present invention has been described with reference to preferred embodiments, workers skilled in the art will recognize that changes may be made in form and detail without departing from the spirit and scope of the invention. For example, the present invention can be adapted for the HART® protocol, the Fieldbus protocol and potentially any other digital protocol. The particular protocol selected will affect the laser diode power cycling frequency, the laser diode duty cycle, data compression techniques and communication rates.

What is claimed is:

1. A system for transmitting optical power from a first location to a second location, comprising:

a first light source at the first location which generates a first light beam;

a first optical-to-electrical converter at the second location which receives the first light beam;

an energy storage device electrically coupled to the first optical-to-electrical converter, which develops a level of stored energy;

a second light source at the second location;

first control means comprising a first level detector which has a first response time characteristic, an input coupled to the energy storage device and an output coupled to the second light source for operating the second light source at the second location to generate a return safety light beam after the level of stored energy reaches a first voltage level, and comprising a second level detector which has a second response time characteristic that is faster than the first response time characteristic, an input coupled to the energy storage device and an output coupled to the first level detector for inhibiting the first level detector when the level of stored energy reaches a second voltage level that is greater than the first voltage level;

a second optical-to-electrical converter which detects the return safety light beam at the first location; and second control means coupled between the second optical-to-electrical converter and the first light source for determining the presence or absence of the return safety light beam and for operating the first light source to generate the first light beam at a first power level prior to determining the presence of the return safety light beam and at a second power level, higher than the first power level, after determining the presence of the return safety light beam.

2. The system of claim 1 wherein:

the first optical-to-electrical converter comprises a photovoltaic power converter; and the first voltage level is indicative of the level of stored energy on the energy storage device when the first light source is operated at the first power level.

3. The system of claim 1 and further comprising an electrical device at the second location, wherein:

the first control means further comprises means coupled to the output of the second level detector for selectively coupling the energy storage device to the electrical device when the level of stored energy reaches the second voltage level.

4. The system of claim 1 and further comprising a first optical fiber extending from the first location to the second location and optically coupled to the first light source and the first optical-to-electrical converter; and a second optical fiber extending from the first location to the second location and optically coupled to the second light source and the second optical-to-electrical converter.

5. The system of claim 1 and further comprising: a single optical fiber optically coupled to the first and second light sources and the first and second optical-to-electrical converters.

6. The system of claim 5 wherein the first light source pulses between on and off states and the second control means determines the presence or absence of the return safety light beam solely during the off state.

7. The system of claim 6 wherein the first control means comprises:

zero level detector means coupled to the first optical-to-electrical converter for generating a zero level output signal when the first light source is being operated at the second power level and is in the off state;

a pulse generator coupled to the zero level detector means which generates a return electrical safety pulse in response to the zero level output signal; and an optical driver electrically coupled between the pulse generator and the second light source, which applies the return electrical safety pulse to the second light source during the off state of the first light source.

8. The system of claim 7 and further comprising an electrical device in the second location, wherein the first control means further comprises:

microprocessor means having a first input coupled to the zero level detector for receiving the zero level output signal, a second input coupled to the electrical device for receiving data, an inhibit output coupled to the pulse generator and a data output coupled to the optical driver; and wherein the microprocessor means inhibits the pulse generator through the inhibit output when the data is received from the electrical device and then applies the data to the optical driver to generate an information light beam through the second light source which is modulated with the data.

9. The system of claim 8 wherein the second control means determines the presence or absence of the information light beam during the off state of the first light source and reduces the power level at which the first light source is operated from the second power level to the first power level if the information light beam is absent.

10. The system of claim 9 wherein the second control means returns the first light source to the second power level when the presence of the return safety light beam is determined at a subsequent off state of the first light source.

11. The system of claim 9 wherein the second control means extends the off state of the first light source for a sufficient length of time to receive the information light beam when the second control means determines the presence of the information light beam.

12. The system of claim 8 and further comprising:

a modem coupled between the electrical device and the second input of the microprocessor means; and an A/D converter coupled between the electrical device and a third input of the microprocessor means.

13. A system for safely transmitting power optically from a first location to an electrical device at a second location, comprising:

a first light source at the first location which generates a first light beam and is operable at a first power level and a second power level, which is greater than the first power level;

a first optical-to-electrical converter at the second location which receives the first light beam and converts the first light beam into electrical power;

an energy storage device electrically coupled to the first optical-to-electrical converter and to the electrical device, wherein the energy storage device develops a level of stored energy in response to the electrical power;

a first energy level detector electrically coupled to the energy storage device which generates a first return safety electrical signal as a function of the level of stored energy wherein the first energy level detector has an inhibit input and has a first threshold energy level;

a second energy level detector electrically coupled the energy storage device and having an output electrically coupled to the inhibit input, wherein the second energy level detector has a second threshold energy level which is greater than the first threshold energy level;

a second light source at the second location and electrically coupled to the first energy level detector, wherein the second light source generates a return safety light beam in response to the first return safety electrical signal;

a second optical-to-electrical converter at the first location which receives the first return safety light beam and converts the return safety light bean into a second return safety electrical signal; and a control circuit having an input electrically coupled to the second optical-to electrical converter and a control output electrically coupled to the first light source, which operates the first light source through the control output at the first and second power levels as a function of the second return safety electrical signal.

14. The system of claim 13 and further comprising: a switch coupled between the energy storage device and the electrical device, wherein the switch has a control input electrically coupled to the output of the second energy level detector.

15. The system of claim 14 wherein the second energy level detector has a faster response characteristic than the first energy level detector.

16. The system of claim 13 and further comprising:

a first optical fiber extending from the first location to the second location and optically coupled to the first light source and the first optical-to-electrical converter; and a second optical fiber extending from the first location to the second location and optically coupled to the second light source and the second optical-to-electrical converter.

17. The system of claim 13 and further comprising: a single optical fiber optically coupled to the first and second light sources and the first and second optical-to-electrical converters.

18. The system of claim 17 wherein the control circuit operates the first light source to pulse between on and off states and wherein the system further comprises:

a zero level detector electrically coupled to the first optical-to-electrical detector, which generates a zero level output signal;

a pulse generator electrically coupled to the zero level detector which generates an electrical safety pulse in response to the zero level output signal; and an optical driver circuit electrically coupled between the pulse generator and the second light source which drives the second light source to generate a light safety pulse in response to the electrical safety pulse.

19. The system of claim 18 and further comprising a microprocessor having a first input coupled to the zero level detector for receiving the zero level output signal, a second input coupled to the electrical device for receiving data, a shift register for storing the data, an inhibit output coupled to the pulse generator and a data output coupled to the optical driver circuit.

20. An optical interface module comprising:

a photovoltaic power converter;

a light source;

an electrical storage device electrically coupled to the photovoltaic power converter;

an electrical load;

a switch coupled between the electrical storage device and the load and having a control input;

a first energy level detector coupled between the electrical storage device and the light source, which detects a first level of energy and has an inhibit input; and a second energy level detector coupled between the electrical storage device and the inhibit input of the first energy level detector and between the energy storage device and the control input of the switch, wherein the second energy level detector detects a second energy level which is greater than the first energy level and has a faster response characteristic than the first energy level detector.

21. An optical interface module for communicating with an electrical devise, comprising:

a photovoltaic power converter;

a zero level detector electrically coupled to the photovoltaic power converter;

a pulse generator electrically coupled to the zero level detector, which has an inhibit input;

an optical driver circuit electrically coupled to the pulse generator;

a light source electrically coupled to the optical driver circuit; and a microprocessor having a first input coupled to the zero level detector, a second input coupled to the electrical device for receiving data, a shift register for storing the data, an inhibit output coupled to the pulse generator inhibit input and a data output coupled between the shift register and the optical driver circuit.

22. A method of safely transmitting power to a remote electrical device, comprising:

generating a first light beam at a first power level;

transmitting the first light beam from a first location to the remote electrical device at a second location;

detecting the first light beam at the second location;

generating a return safety light beam at the second location after detection of the first light beam at the second location;

generating a return data light beam at the second location;

inhibiting the step of generating a return safety light beam when generating the return data light beam;

transmitting one of the return safety light beam and the return data light beam from the second location to the first location;

detecting a presence of one of the return safety light beam and the return data light beam at the first location;

increasing the first light beam from the first power level to a second power level, higher than the first power level, after detecting the presence of one of the return safety light beam and the return data light beam at the first location;

detecting an absence of the return safety light beam and the return data light beam at the first location when the first light beam is generated at the second power level; and reducing the first light beam from the second power level to the first power level after detecting the absence of the return safety light beam and the return data light beam.

23. The method of claim 22 wherein:

the step of generating a first light beam comprises generating a first light beam which pulses between on and off states; and the step of detecting one of the return safety light beam and the return data light beam at the first location comprises detecting during the off state of the first light beam.

24. The method of claim 23 wherein the step of generating the return data light beam at the second location comprises detecting an off state of the first light beam and generating the return data light beam during the off state.

25. The method of claim 24 and further comprising extending the off state when generating the return data light beam.

26. A system for transmitting optical power from a first location to a second location, comprising:

a first light source at the first location which generates a first light beam that pulses between on and off states;

a first optical-to-electrical converter at the second location which receives the first light beam;

a second light source at the second location;

zero level detector means coupled to the first optical-to-electrical converter for generating a zero level output signal when the first light beam is in the off state;

a pulse generator coupled to the zero level detector means which generates a return electrical safety pulse in response to the zero level output signal; and an optical driver electrically coupled between the pulse generator and the second light source, which applies the return electrical safety pulse to the second light source during the off state of the first light beam for operating the second light source to generate a return safety light beam;

a second optical-to-electrical converter which detects the return safety light beam at the first location; and second control means coupled between the second optical-to-electrical converter and the first light source for detecting the presence or absence of the return safety light beam and for operating the first light source to generate the first light beam at a first power level after detecting the absence of the return safety light beam and at a second power level, higher than the first power level, after detecting the presence of the return safety light beam.

* * * * *

UNITED STATES PATENT AND TRADEMARK OFFICE
CERTIFICATE OF CORRECTION

PATENT NO. : 5,771,114
DATED : June 23, 1998
INVENTOR(S) : Anders G. Andersson and Michael J. Smith It is certified that error appears in the above-indentified patent and that said Letters Patent is hereby corrected as shown below:

Column 13, line 19, change "bean" to --beam--.

Signed and Sealed this

Twenty-third Day of February, 1999

Attest:

Attesting Officer

Q. TODD DICKINSON

Acting Commissioner of Patents and Trademarks